(12) United States Patent
Chmielus

(10) Patent No.: US 11,876,611 B2
(45) Date of Patent: Jan. 16, 2024

(54) DRONE DEFENSE SYSTEM

(71) Applicant: Thorsten Chmielus, Strickscheid (DE)

(72) Inventor: Thorsten Chmielus, Strickscheid (DE)

( * ) Notice: Subject to any disclaimer, the term of this patent is extended or adjusted under 35 U.S.C. 154(b) by 207 days.

(21) Appl. No.: 17/314,471

(22) Filed: May 7, 2021

(65) Prior Publication Data

US 2021/0367700 A1 Nov. 25, 2021

(30) Foreign Application Priority Data

May 19, 2020 (DE) .......................... 102020113564.5

(51) Int. Cl.
*H04K 3/00* (2006.01)
*G01S 19/01* (2010.01)
*B64C 39/02* (2023.01)

(52) U.S. Cl.
CPC .............. *H04K 3/42* (2013.01); *G01S 19/015* (2013.01); *H04K 3/45* (2013.01); *H04K 3/65* (2013.01); *B64C 39/024* (2013.01)

(58) Field of Classification Search
CPC ... H04K 3/42; H04K 3/45; H04K 3/65; G01S 19/015; B64C 39/024
See application file for complete search history.

(56) References Cited

U.S. PATENT DOCUMENTS

| 2011/0223851 A1* | 9/2011 | Stoddard | .................. H04K 3/44 455/1 |
| 2014/0266851 A1 | 9/2014 | Fink et al. | |
| 2018/0007518 A1* | 1/2018 | O'Berry | ............. H04B 7/18506 |

FOREIGN PATENT DOCUMENTS

| DE | 102010056268 A1 | 6/2012 | |
| DE | 102018122951 A1 | 3/2020 | |
| WO | WO-2020058340 A1 * | 3/2020 | .............. F41H 11/02 |

* cited by examiner

*Primary Examiner* — John J Lee
(74) *Attorney, Agent, or Firm* — Cermak Nakajima & McGowan LLP; Malcolm K. McGowan

(57) ABSTRACT

Described herein is a system for drone defense, comprising at least one jammer and at least one radio detector, wherein the jammer is set up to send an interference signal over a frequency range, and the radio detector is set up to detect a radio control signal of a drone, the frequency range of the interference signal comprises a carrier frequency of the radio control signal or a GPS signal, wherein the jammer is configured to temporarily interrupt the interference signal and the radio detector is configured to receive the interference signal, detect the interruptions and detect the radio control signal of the drone within the interruptions of the interference signal.

12 Claims, 1 Drawing Sheet

DRONE DEFENSE SYSTEM

CROSS-REFERENCE TO RELATED APPLICATIONS

This application claims priority under 35 USC 119 from German application DE 10 2020 113 564.5, filed on May 19, 2020, the contents of which are incorporated by reference herein in their entirety.

BACKGROUND

Systems for defense against drones are well known. Jammers are used to interfere with the control signals between a transmitter and a drone. This forces the drone to land or turn around, depending on how the drone is programmed in the event of an interruption in the control signals. Furthermore, it is also desirable in such a system to continuously detect the exact position of the drone and, if necessary, to intercept control signals for their evaluation. However, since an interfering signal cannot be sent at the same time and the drone can be targeted or the control signals can be intercepted in the same frequency range, it is already known in the prior art to temporarily interrupt the interfering signals in order to locate or detect the in this time window Signal content. A corresponding system is described in DE 10 2010 056 268 A1, for example.

However, such systems have the disadvantage that the direction finder and the jammer must be technically connected to one another in order to carry out the interference and the radio monitoring in a coordinated manner.

SUMMARY

Provided herein is a system which enables the control signals to be monitored in a simple manner and, at the same time, to disrupt the control signals for a drone.

A special feature of the drone defense system described herein is a radio detector which automatically detects when the jammer interrupts the transmission of the interference signals, in order to detect the control signal in these time windows. For example, the control signal can be evaluated in these time windows in order to determine the position of the drone or to intercept the content of the control signal. The jammer and the radio detector are matched to one another because the jammer is set up to interrupt the interference signal for defined periods of time in order to enable the radio detector to detect the signal. However, the devices do not need to be connected to one another in order to interfere and detect the carry out control signals from the drone because the radio detector automatically detects when the jammer interrupts the jamming signal.

In one embodiment, the jammer and the radio detector are arranged spatially separated without a wired connection. Since the radio detector automatically detects the time window of the interruption of the interference signal, it does not need any connection with the Jammer, neither a wired nor a wireless connection. Furthermore, it can be arranged spatially separated from the jamming, which has the advantage that the radio detector can be designed to be mobile in order to bring it closer to the drone. Since the power consumption of the radio detector is also less than that of the jamming transmitter, the jamming transmitter can, for example, be arranged in a stationary manner, while the radio detector is operated only with a portable energy store.

In one embodiment, the radio detector has a radio direction finder which is set up to determine a position of the drone and/or a position of a transmitter which transmits the radio control signals to control the drone. This information is useful for drone defense. Furthermore, it can also be provided that the information about the position of the drone is transmitted to the jammer, preferably wirelessly, so that the jammer adjusts the transmission of the interference signal in accordance with the current position of the drone.

In one embodiment, the interference signal of the jammer is set up to accept a protocol of the control data of the detected drone and to output changed control data for deflecting the drone. The jammer receives the information about the control signal used by the drone via the radio detector, which is set up to evaluate the control data of the drone. By changing the control data, the drone can be taken off course and forced to land or steered out of a hazardous area. The radio detector can also be set up to simulate corresponding response signals from the drone, so that the transmitter of the original control signals for the drone receives a response which reports the wrong position of the drone. In this way, the control of the drone can be completely taken over and the sender of the control signals no longer has control over the drone. Ideally, the operator at the control of the drone does not even know that the drone is actually being deflected.

According to a further embodiment, the interference signal can also include GPS spoofing. The GPS signal is changed in such a way that the drone determines a wrong position when determining its position. Suitable spoofing can therefore also be used to redirect the drone without having to change the control signals yourself. Since the drone subjectively perceives the wrong position, any response data that the drone sends back to the sender of the control data also contain the wrong position. In this case, the sender of the control data cannot determine that the drone has actually been diverted to a different course.

In one embodiment, the system includes several radio detectors which are set up to determine the position of the drone and/or the transmitter by means of a cross bearing. With a cross bearing, the position of the drone or the sensor controlling the drone can be determined precisely. Since the radio detectors can be arranged spatially independently of the jamming, the division of the radio detectors for cross direction finding is particularly easy to implement in this system.

In one embodiment, the system comprises several of the jammers which are arranged spatially spaced apart and/or are set up to emit interference signals in different directions. For example, a large number of jammers can be provided in order to be able to cover a large area for drone defense. The radio detector, on the other hand, can be moved around in order to precisely locate the drone. Alternatively or additionally, the jammers can also be set up to emit interference signals in different directions. For example, a large number of permanently installed jammers can be activated in order to only emit interference signals in certain areas of a room to be monitored by drones.

In one embodiment, the radio detector is set up to transmit information relating to the position of the drone and/or relating to a frequency range of the detected control signal of the drone to the jammer, preferably wirelessly. In this embodiment, the information about the drone is used to readjust the jamming. The jammer can adapt the spatial transmission of the interference signal and/or the frequency range over which the interference signal is transmitted according to the detected position or the detected frequency of the control signal of the drone. This embodiment can especially be combined with several jammers. In a preferred embodiment, one or more jammers is/are set up to adapt the interfering signal to the frequency range of the detected control signal, and/or adapt the spatial emission of the interfering signal according to the detected position of the drone.

Further features and advantages of the present invention will become apparent from the following description, which is given in conjunction with the accompanying figures.

DETAILED DESCRIPTION

Figure 1:
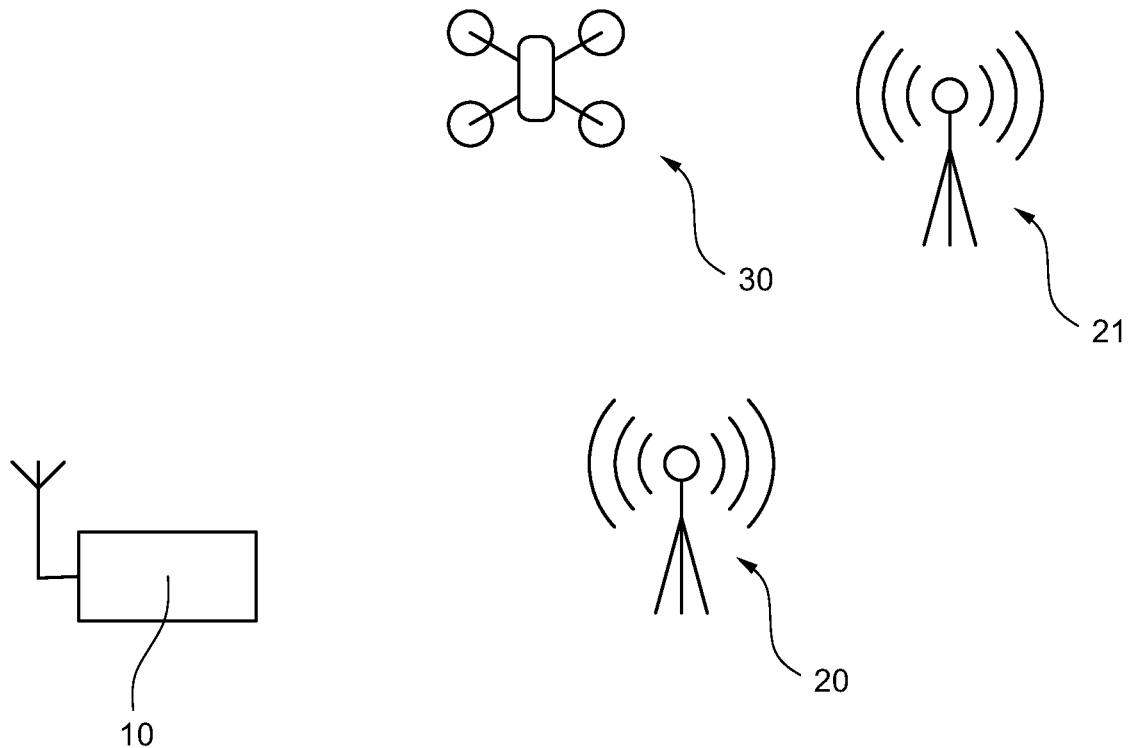
FIG. 1 shows schematically a system for drone defense according to an embodiment of the invention.

With reference to FIG. 1, a system for drone defense is described which comprises a radio detector 10 and, in this embodiment, two jammers 20, 21. However, a single jammer 20 is also sufficient for embodiments of the invention. Alternatively, even more jammers and/or radio detectors can be present. The jammers are set up to send a jamming signal which forces a drone 30 to turn around or land. The interference signal can include, for example, the frequency range of a control signal from the drone. A GPS signal can also be disrupted so that the drone can no longer be steered over a wider area. The system also enables the position of the drone to be determined. For this purpose, a radio direction finder is provided in the radio detector 10, which can determine the direction and distance of the drone. As an alternative or in addition, several radio detectors 10 could also be provided which, for example, determine the position of the drone by means of a cross bearing.

Figure 2:
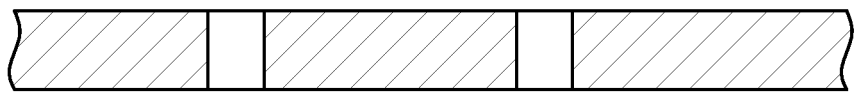
FIG. 2 schematically shows an interference signal of the jammer and a control signal received at the radio detector in a system for defense against drones according to an embodiment of the invention.
Figure 2:
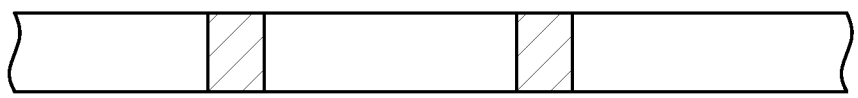

However, since the radio detector 10 cannot operate simultaneously on the same frequency as the jammers emitted interference signal, it is provided that the jammers temporarily interrupt the transmission of the interference signal. As shown in FIG. 2, a jammer can send out an interfering signal over time (hatched area in the upper bar) and temporarily, e.g. in a time window between 1 µs and 10 ms, interrupt the emission of the interfering signal.

In one embodiment, the interference signal from the transmitter can simply superimpose the control signal on the same frequency band so that the drone no longer receives a control signal. According to further embodiments, however, it is also possible to specifically supply the drone with incorrect transmission data by adopting the protocol of the control data in order to deflect the drone or force it to land. Furthermore, it is also possible, by changing the GPS data (so-called spoofing), to simulate a wrong position for the drone, so that the drone, which determines its flight path according to the GPS reception, is forced onto a wrong course. The control signal from the transmitter cannot even determine that the drone has been deflected, because response data from the drone to the control data transmitter also contain the wrong position data.

The radio detector 10 is set up to receive the interference signal and to determine the interruptions in the interference signal. In the time windows in which the interference signal from jammer 20 is interrupted, the radio detector can detect the control signal of the drone, for example in order to locate the drone or to record the content of the control signal.

Furthermore, the radio detector 10 can also determine whether the control signal is changing. This information can optionally be forwarded to one or more jammers 20, 21, preferably wirelessly, in order to readjust the jammer or jammers accordingly so that the interference signal is adapted to the changed control signal.

The interruption of the interference signal can only be a few microseconds, e.g. less than 20 microseconds, since the relatively short pauses are sufficient for the radio detector 10 to locate the drone.

The interruption of the jamming signal can also occur at irregular intervals in order to prevent any drone control systems from recognizing probable interruptions and using the interruptions to control the drone only in the interruption phases. The radio detector does not have to know the length of the interruptions in the interfering signal from the start because it detects the interruption of the interfering signal independently, i.e. without a direct connection to the jammer, and uses it to detect the control signal.

In embodiments in which the interference signal is used specifically to deflect the drone (e.g., transfer of the control data log or GPS spoofing) the jammer preferably receives data from the radio detector in order to set the control data or GPS data according to the actual position of the drone or the intercepted log of the control data. Nevertheless, the jammer is preferably connected wirelessly to the radio detector, so that the radio detector can be operated independently of the jammer. In simple embodiments, however, it would be possible to establish a wired connection between the jammer and the detector, but not to interrupt the control data, but only to forward the control signals received and tapped by the radio detector to the jammer.

The invention claimed is:

1. A system for drone defense, comprising at least one jammer and at least one radio detector, wherein the jammer is configured to transmit an interference signal over a frequency range, and the radio detector is configured to detect a radio control signal from a drone, wherein the frequency range of the interference signal comprises a carrier frequency of the radio control signal or a GPS signal, characterized in that the jammer is configured to temporarily interrupt the interference signal and the radio detector is configured to receive the interference signal, and the radio detector is further configured to automatically detect when the jammer interrupts the transmission of the interference signals, in order to determine the position of the drone or to intercept the content of the control signal of the drone in the time windows when the jammer interrupts the transmission of the interference signals.

2. A system according to claim 1, wherein the at least one jammer and the at least one radio detector are arranged spatially separated without a wired connection.

3. A system according to claim 1, wherein the at least one radio detector has a radio direction finder which is configured to detect at least one of a position of the drone and a position of a transmitter which sends out the radio control signals to control the drone.

4. A system according to claim 1, wherein the interference signal comprises a takeover of a protocol of the control data of the drone in order to deflect the drone, the at least one jammer receiving information about the protocol of the control data from the at least one radio detector.

5. A system according to claim 4, wherein the at least one jammer wirelessly receives information about the protocol of the control data from the at least one radio detector.

6. A system according to claim 1, wherein the interference signal comprises a spoofing of the GPS signal in order to falsify a position determined by the drone via GPS.

7. A system according to claim 1, which comprises multiple radio detectors which are configured to determine the position of the drone or the transmitter by means of a cross bearing.

8. A system according to claim 1, which comprises multiple jammers which are arranged spatially spaced or are configured to emit interference signals in different directions.

9. A system according to claim 8, wherein the multiple jammers are configured to adapt at least one of the interference signal to the frequency range of the detected control signal, and the spatial emission of the interference signal according to the detected position of the drone.

10. A system according to claim 1, wherein the at least one radio detector is configured to transmit information regarding the position of the drone or with regard to a frequency range of the detected control signal of the drone to the at least one jammer.

11. A system according to claim 10, wherein the at least one radio detector is configured to transmit information wirelessly to the at least one jammer.

12. A system according to claim 1, wherein the at least one jammer is configured to adapt at least one of the interference signal to the frequency range of the detected control signal, and the spatial emission of the interference signal according to the detected position of the drone.

* * * * *